(12) United States Patent
Bergmann

(10) Patent No.: US 6,278,953 B1
(45) Date of Patent: Aug. 21, 2001

(54) AUTOMATED ALIGNMENT SYSTEM

(75) Inventor: Ernest Eisenhardt Bergmann, Fountain Hill Borough, Lehigh County, PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/175,503

(22) Filed: Oct. 20, 1998

(51) Int. Cl.[7] .................................................. G06F 17/00
(52) U.S. Cl. ............................................................ 702/85
(58) Field of Search .................................. 702/85, 86, 92, 702/93, 104, 106, 107, 94, 95, 153, 159; 324/76.41; 73/105; 331/154; 455/266

(56) References Cited

U.S. PATENT DOCUMENTS 5,431,664 * 7/1995 Ureche et al. ........................ 331/154
5,822,687 * 10/1998 Bickley et al. ...................... 455/266

OTHER PUBLICATIONS

"Design of a multivariable self–tuning controller for a class of distributed parameter systems", Rohal–Ilkiv et al, May 18, 1990, Slovak Technical University, Czechoslovakia.*

"Recursive algebraic curve fitting and rendering", Shouqing Zhang et al., 1998, Nanyang Technological University, Singapore.*

* cited by examiner

Primary Examiner—Christine Oda
Assistant Examiner—Khoi Hung Duong
(74) Attorney, Agent, or Firm—Wendy W. Koba

(57) ABSTRACT

An automated "tuning" system is disclosed that utilizes the known tuning curve (on an approximation thereof) to control the tuning process. In particular, the tuning curve is transformed (if necessary) into a quadratic with a local maximum, where the maximum is associated with the optimum tuning value. In one embodiment, the tuning system of the present invention may be used to provide alignment between optical components. The system may be organized to recognize "backlash" in the tuning process and perform additional tuning adjustments to overcome this backlash. Each tuning curve may be one-dimensional and a set of such curves used to provide for an N-dimensional tuning.

14 Claims, 3 Drawing Sheets

AUTOMATED ALIGNMENT SYSTEM

TECHNICAL FIELD

The present invention relates to an automated tuning system and, more particularly, to a system that uses a priori knowledge of the general shape of the tuning curve to automate the tuning process.

BACKGROUND OF THE INVENTION

In general, there are many systems that require a first element to be "tuned" with respect to a second element in accordance with a predetermined parameter relating the two. For example, a radio receiver needs to be properly tuned to an RF signal in order to capture a particular transmitted signal. In the field of astronomy, star tracking is accomplished by controlling the image centering using a photomultiplier.

In the field of optical component assembly, it is important that the maximum optical signal power be coupled between the components. In this case, "tuning" relates to the alignment of a first piece part to a second piece part. In most conventional optical component assembly systems, a first component is often affixed to an x-y-z alignment table and a second component is held in a fixed position. The first component is then moved in all three axes, relative to the second component, until maximum coupled power is achieved. Practical, as well as experimental, limitations exist in the conventional methods of obtaining this alignment, as well as with the other "tuning" examples mentioned above. For example, "backlash" associated with the movement of the alignment table has been found to hinder the alignment process.

In more general situations, the need frequently arises where a parameter is changed (for example, relative position of two components in an optical subsystem) and a figure of merit (for example, coupled power between the components) is measured. There are many arrangements for recording the figure of merit and using the recorded data to determine when the parameter has been optimized. What is needed in the industry is a robust technique that takes into consideration the problem of backlash, as well as other sources of "noise" in the tuning process.

SUMMARY OF THE INVENTION

The need remaining in the prior art is addressed by the present invention, which relates to an automated tuning system and, more particularly, to a system that uses the a priori knowledge of the general shape of the tuning curve to automate the tuning process.

In accordance with the present invention, the a priori knowledge of the tuning curve (a "figure of merit"; for example, coupled power as a function of displacement between a pair of optical components) is used to define a mathematical approximation to the tuning curve. The mathematical expression may then be transformed (if necessary) into quadratic form with a negative coefficient. As such, the quadratic will exhibit a local maximum, where the maximum value is associated with the proper alignment between the components. That is, the local maximum can then be used to identify the proper displacement (x-, y- or z-axis) between the components required to achieve maximum coupling.

For a multi-dimensional alignment situation, the process may be repeated to achieve alignment in each dimension. For an exemplary optical x-y-z alignment situation, one process may hold "z" (the axial alignment direction) fixed and find the best x-y alignment for that "z", then move inward along the z-axis (since the axial displacement is known, a priori, to be greater than optimal axial location) and re-do the x-y alignment at the new "z" location. This process may then be repeated until the best x-y-z alignment is achieved for all three axes.

It is an advantage of the process of the present invention that problems related to backlash are overcome by performing a series of alignment steps around the calculated maximum value.

Other and further advantages of the present invention will become apparent during the course of the following discussion and by reference to the accompanying drawings.

BRIEF DESCRIPTION OF THE DRAWINGS

Referring now to the drawings.

DETAILED DESCRIPTION

The following discussion of the automated tuning process of the present invention will describe the inventive technique as applied to aligning two components of an optical subsystem. It is to be understood that the principles of the present invention may readily be applied to virtually any tuning problem, as long as a "figure of merit" assessing the quality of the tuning can be measured. In the exemplary optical alignment case, the "figure of merit" is the optical power coupled between the two components. In another context, related to aligning radio receiver to an antenna, the figure of merit may be the power of the received signal. In general, any tuning situation may find the technique of the present invention to be of value.

Figure 1:
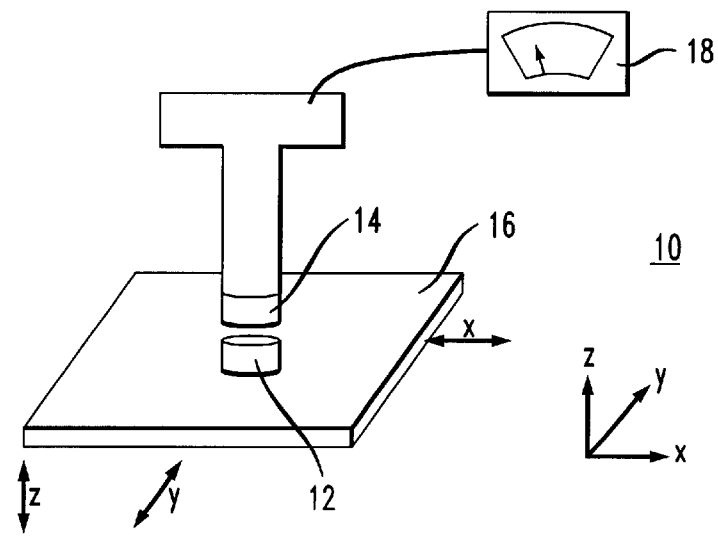
FIG. 1 illustrates an exemplary optical alignment system capable of utilizing the tuning process of the present invention.

Referring now to FIG. 1, an optical alignment arrangement 10 that may be used to implement the present invention is shown. In general, it is desired to align a first optical component 12 to a second optical component 14, where component 12 may comprise a laser subassembly and component 14 may comprise lensing optics and a transmission fiber. Other possibilities exist. First component 12 is illustrated as fixed to an alignment table 16. Alignment table 16 is a conventional arrangement, well-known in the art, that is capable of moving first component 12 relative to second component 14 in all three axes (X, Y and Z), as indicated by the arrows in FIG. 1 (alternatively, table 16 could be "fixed" and second component 14 moved relative to first component 12 on table 16 to achieve alignment). A power monitor 18 is coupled to second component 14. When first component 12 is energized to emit an optical signal, the degree of coupling between first component 12 and second component 14 will be measured by power monitor 18. The alignment is considered completed when a maximum optical power signal is measured by monitor 18.

For one exemplary arrangement of the present invention, the general shape of the "tuning curve" for the arrangement of FIG. 1 (with respect to a chosen parameter, such as the "X" direction) may be Gaussian. Alternatively, the curve may be Lorenztian (for example, with respect to the "z" direction), or any other possible curve defined as a "peaked function", with one local maximum, and the curve essentially parabolic in the region of the maximum. In any case, however, neither the exact location of the maximum value nor the height of the curve (indicating alignment of first component 12 to second component 14) are known. Additionally, the characteristic width (w) of the peak is unknown. In the prior art, the alignment table would be adjusted along all three axes, using no particular sequence of alignment moves, until the maximum coupling was achieved. This process usually expended a great deal of time and usually required an individual to perform (or at least monitor) the alignment process. One other prior art technique would start with a large separation of the alignment table from the optics ("large z") and adjust the x- and y-axes to maximize coupled power for that particular distance z. The distance would then be decreased and x- and y-adjustments made again to maximize coupled power, if necessary. Advantageously, the automated alignment process of the present invention reduces the time required to perform the alignment, as well as removes the need for human control of the alignment process.

In accordance with the present invention, the first step is to ascertain the approximate shape of the "figure of merit" curve, in this case, the tuning curve. Using this knowledge, a transform is chosen that will convert the curve into an approximate quadratic with a negative coefficient. As mentioned above, in optical communication systems, the tuning curve may be, for example, essentially Gaussian and can be expressed as follows:

$$r(x) = ae^{-x^2/w^2},$$

where "W" is the width of the curve. By choosing the transform $f(\alpha) = \ln(\alpha)$, the following quadratic in x is obtained:

$$p(x) = \ln(r(x)) = \ln(a) - x^2/w^2$$

Figure 2:
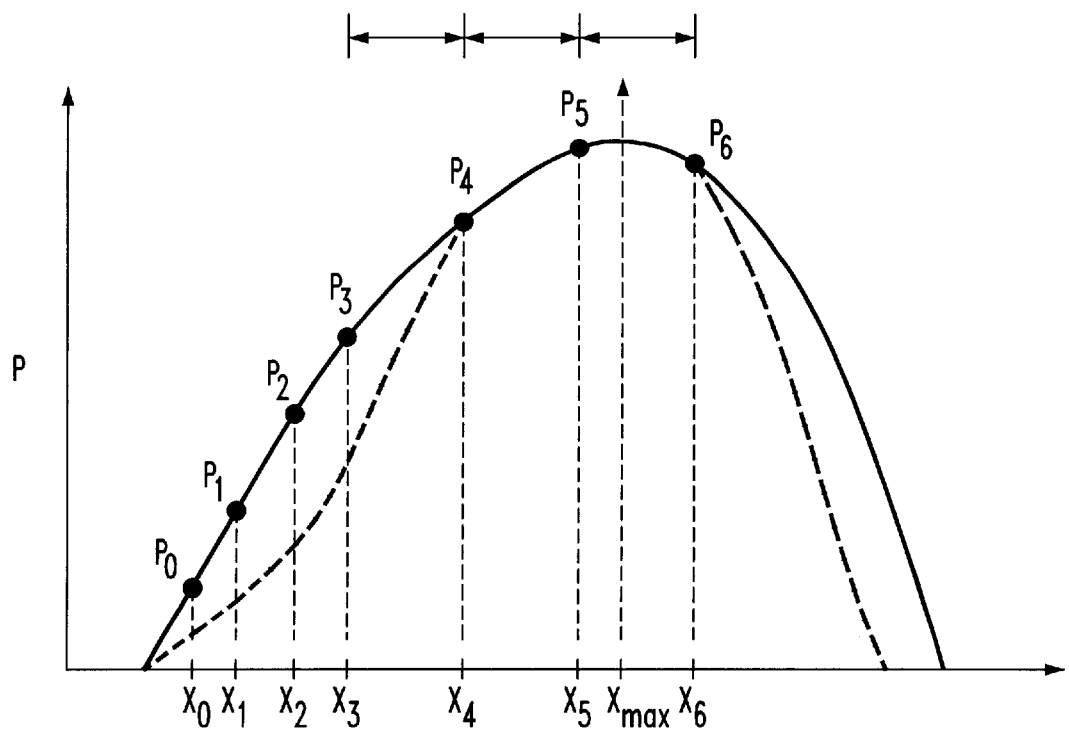
FIG. 2 is an exemplary tuning curve useful in performing the tuning process of the present invention.

FIG. 2 illustrates the quadratic obtained for this particular transform. In accordance with the present invention, the use of the quadratic form will allow for the maximum value to be found more precisely, where the maximum value of the quadratic will correlate directly with the maximum value of p(x) and x, thereby determining the precise location associated with the optimum alignment, in the x direction, between the optical components. Once the quadratic curve is realized, the alignment table is maneuvered through a set of pre-programmed alignment steps. In particular, the technique of the present invention begins with a first step size for "x", then uses progressively larger step sizes and measures the optical power at each step. For example, the following illustrates a first set of four steps in the alignment process:

$$p_0 = p(x_0)$$

$$p_1 = p(x_0 + \delta x)$$

$$p_2 = p(x_0 + \delta x + 2\delta x)$$

$$p_3 = p(x_0 + \delta x + 2\delta x + 4\delta x), \ldots$$

Exemplary locations of $p_0$, $p_1$, $p_2$ and $P_3$ are illustrated on FIG. 2. Various other methods of changing the step size may be used. For example, the step size $\delta x$ may be doubled, then tripled, etc; alternatively, the step size may be held constant (or even decreased) between each location for p(x). In another embodiment, a maximum step size may be specified and the step size increased until the last incremented step size equals or exceeds this maximum value. Thereafter, subsequent measuring steps will continue to use this maximum step size.

In accordance with the present invention, the movement and measurement process continues until a significant change occurs between successive measurement points. A "significant" change may be, for example, a 10% change when compared to the value $p_2(x)$. Any other suitable change may be used. For the particular example shown in FIG. 2, a "significant change" is defined to have occurred between measurements $p_0$ and $p_3$.

Once a significant change is registered, the next step in the process is to determine if the measurements are moving "upward" toward the maximum or "downward" away from the maximum. That is, if $p_n > p_0$, the steps are moving "upward" toward the maximum; if $p_n < p_0$, the steps are moving "downward", away from the maximum. Again referring to FIG. 2, in this particular example, the measurements are moving "upward" (i.e., $P_2, P_3, \ldots p_5$), that is, the proper direction toward the maximum value. With the direction determined, additional steps (at the last-used step size) are taken in the "upward" direction, until the top of the quadratic curve is passed. That will occur when the most recent measured power drops off relative to the previous measurement (i.e., $P_6 < P_5$).

In accordance with the present invention, the last three values, $p_6$, $p_5$ and $P_4$ (generally, $p^n$, $p_{n-1}$, $P_{n-2}$) are then used to calculate their fit to a quadratic curve, defined as q(x). Even if the overall curve is not exactly quadratic, the region around the peak (that is, from $p_{n-2}$ to $p_n$) will be well-approximated by a quadratic. The quadratic curve q(x) is then used to determine $x_{max}$ (the derivative of the curve q(x)=0 at $x_{max}$). This calculated value of $x_{max}$ is then used to determine the next move of the alignment table. That is, as shown in FIG. 2, the next step size increment will be: $x_{max} - X_n$. The power (or any other assessed figure of merit), $P_{n+1}$, is measured at this point. In the absence of backlash in the system, $p_{n+1}$ will be equal to the calculated $p_{max}$, where it is presumed that $q_{max} = p_{max}$. Therefore, if $p_{n+1}$ is $\geq q_{max}$, the process is completed and the optimum alignment along the x-axis has been found. Otherwise, it will be assumed that "backlash" is present and further movement is required.

Figure 3:
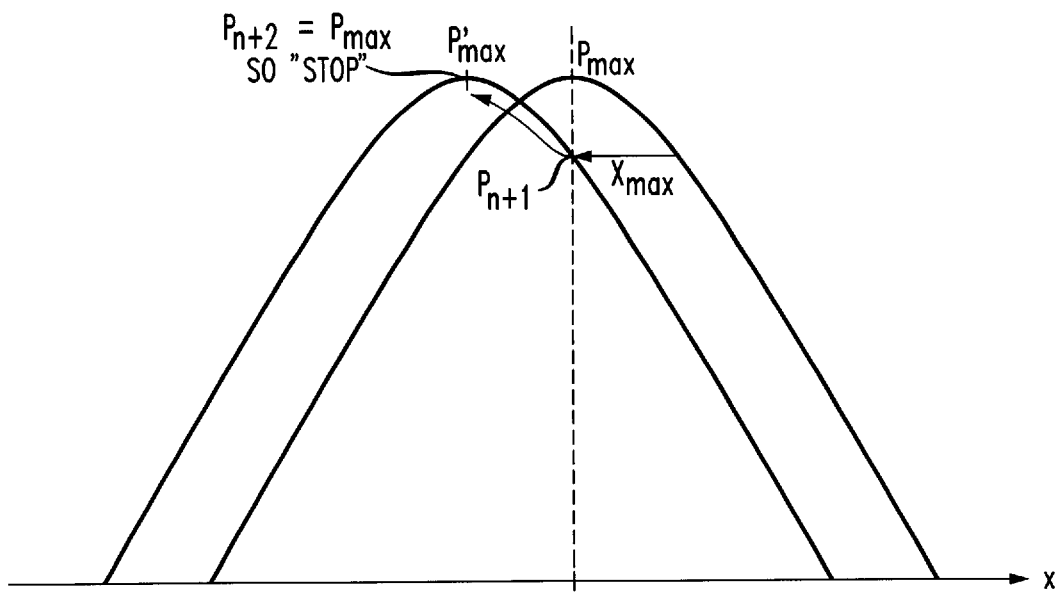
FIGS. 3–5 illustrate pairs of tuning curves useful in performing the alignment process of the present invention in the presence of backlash.

FIG. 3 illustrates a pair of curves p(x) that may be used to discuss backlash. The right-most curve is identical to that of FIG. 2 and the left-most curve is identical to the right-most curve and includes a lateral offset corresponding to the size of the backlash. With backlash present, however, the movement of the alignment table back to the calculated $x_{max}$ location yields a value of $p_{n+1} < p_{max}$. Therefore, further movement is necessary to achieve optimal alignment. Using the value of $p_{max} - p_{n+1}$ and the known quadratic fit q(x), a new step size required to reach $X_{max}$ is calculated and the appropriate movement is made, as shown in FIG. 3. Again, the optical power is measured, defined in this example as $p_{n+2}$, and if $P_{n+2}$ is greater than or equal to $P_{max}$, alignment is achieved and the process is completed. Otherwise, the increment $p_{max} - p_{n+2}$ is calculated and used with the quadratic q(x) to determine the next step size. The process is repeated until the measured power is essentially equal $p_{max}$ (or when a drop in power is seen, suggesting that one has passed the peak alignment value).

Figure 4:
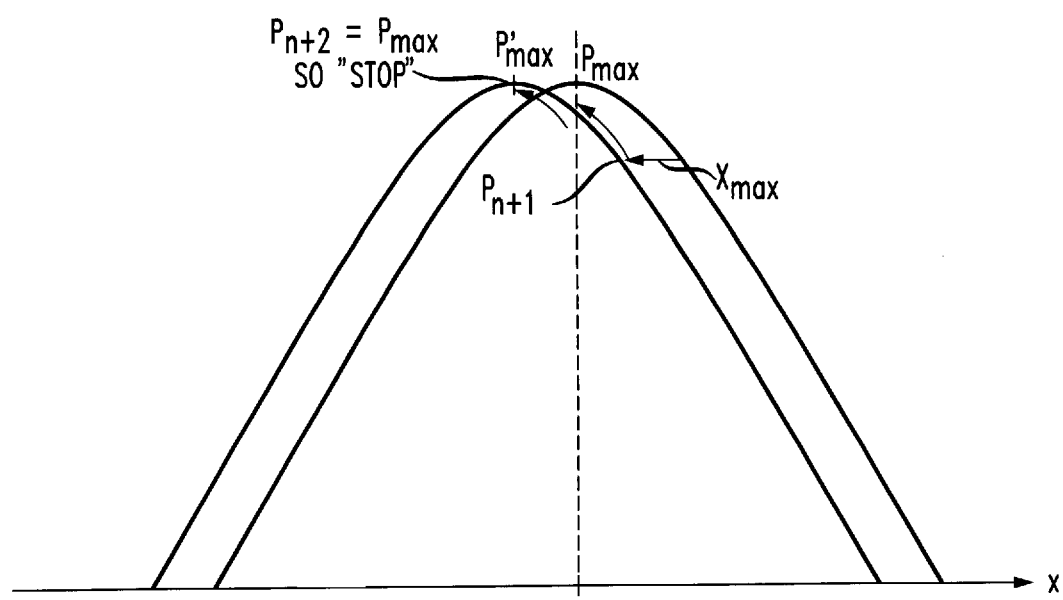
Figure 5:
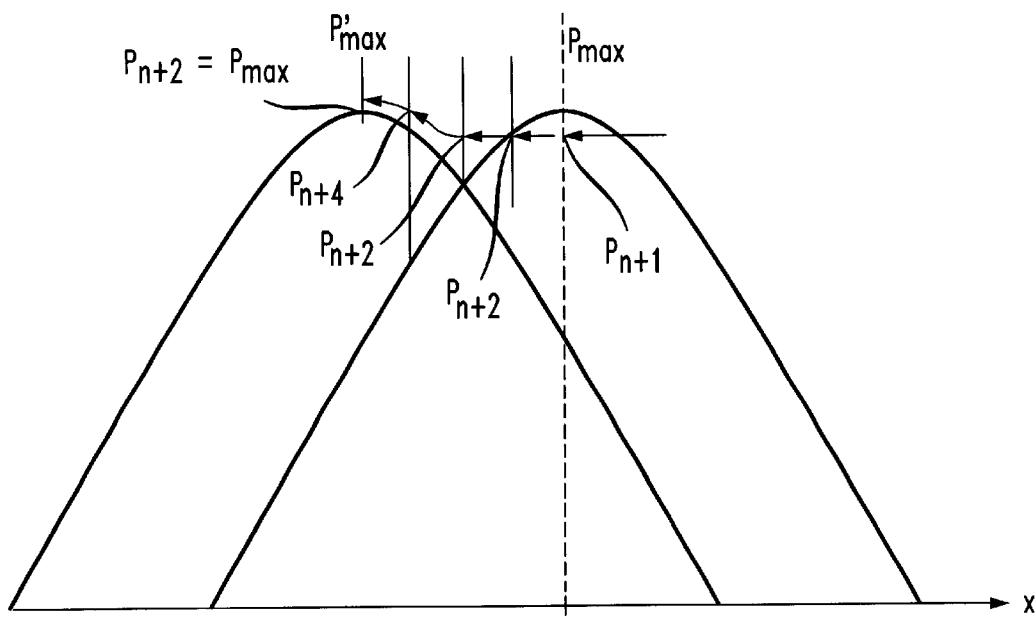

An alternative scenario where backlash is present is illustrated in FIG. 4. In this representation, the actual system backlash is less than the calculated step size and one additional "pass" through the system is needed to obtain the optimum value for $p_{max}$. Additionally, there are systems where the actual "tuning" backlash is much greater than the calculated step size. FIG. 5 contains a pair of alignment curves representing this situation, including a relatively large separation between the curves. In this instance, a number of additional steps may be required to finally arrive at the optimum alignment. In the process of obtaining $p_{max}$, a measurement of the displacement of the pair of curves is obtained, the displacement being the "backlash" associated with the measurement process. It is to be noted that if large backlash is found, this situation may indicate that the alignment equipment may be defective (or, possibly, just "wearing out"). As such, the data related to repeated adjustments may be important as part of an overall quality control process related to the alignment system.

The process as described thus far has found the optimum x-axis alignment between the components (that is, the best achievable x alignment, say, for a given value of y). The same steps may then be repeated, say, to obtain y-axis alignment (again, starting with the known shape of the y-direction tuning curve). That is, a first component is moved relative to the second component along the y-axis and the power $p(y_t)$ measured at a set of points and, using the process as described above, a quadratic fit $q(y)$ is found and is used to determine $y_{max}$.

Figure 6:
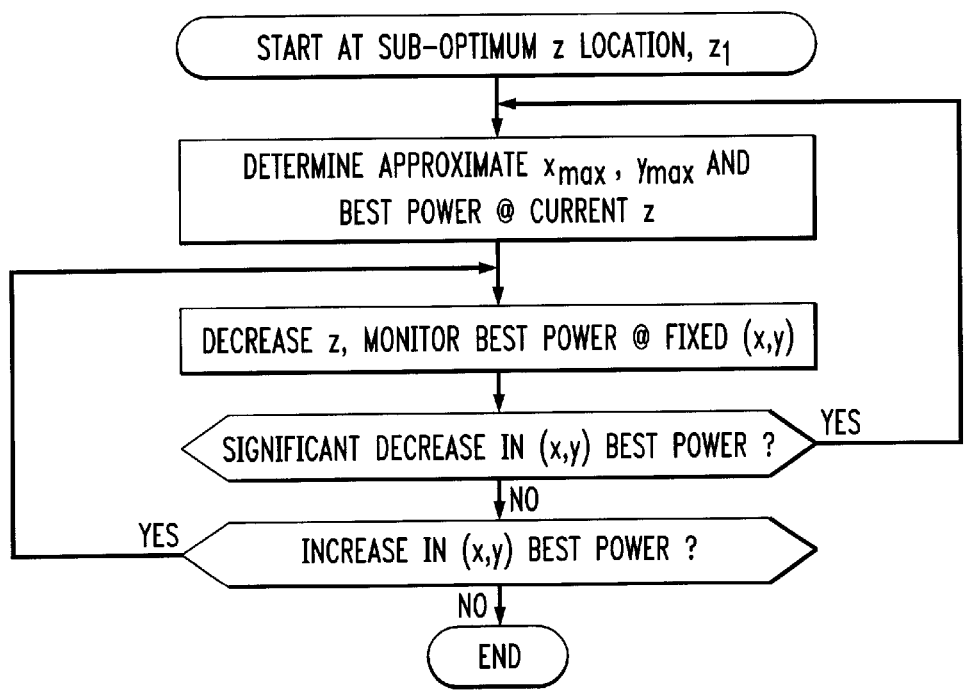
FIG. 6 is an exemplary flow chart illustrating a three-dimensional tuning process performing in accordance with the present invention..

A three-dimensional alignment process involves not only finding the optimum x,y values as described above, but also finds the optimum axial (z-axis) alignment/displacement between the components. In the exemplary optical alignment system, the following three-dimensional alignment process has been found to be preferable. In general, axial alignment is different in that one knows, a priori, that: (1) a "hard boundary" exists (that is, as the piece parts come into direct contact the axial displacement will be "0" and cannot go negative); and (2) alignment starts with an axial separation less than optimum ("z large") and alignment is improved as the piece parts are moved closer together ("z decreases"). Therefore, one process for obtaining maximum three-dimensional alignment in accordance with the present invention begins with a given value for "z" and finds $x_{max}, y_{max}$ for that value. The axial separation is then decreased (holding x,y "fixed") and the power is monitored. When a significant change in coupled power is measured, $x_{max}$ and $Y_{max}$ are refound for this new (closer) z value. The process continues, decreasing z until the power drops, then re-optimizing x,y (or at least determining pmax for that value of z and approximately re-optimizing x,y), followed by again decreasing z, and so on, until no further improvement in x,y is seen (or, alternatively, if x,y power decreases as z is increased). If the power decreased with the last decrease in z, we can use the last three points in z, identified as: $p(z_1)$, $p(z_2)$, and $p(Z_3)$, to estimate the amount of "overshoot" in the z direction; one can "back up" in z in a manner analogous to the backlash discussion above in association with FIGS. 3–5. FIG. 6 is a flow chart illustrating this exemplary three-dimensional alignment process. In general, there may be more than three degrees of adjustment that may be obtained using the process of the present invention. In particular, other "degrees" of adjustment include, for example, rotation, orientation, or polarization.

As noted above, although the process has been described in terms of providing alignment for an optical system, the inventive process may be used in any situation where a "figure of merit" relative to a predetermined parameter can be determined and adjusted in response to measurements. Indeed, the spirit and scope of the present invention is limited only by the claims as appended hereto.

What is claimed is:

1. A method of tuning a first element with respect to a second element according to a parameter x, the method comprising the steps of:
   a) providing the first and second elements;
   b) determining an approximation y=f(x) of the shape of the tuning curve of the second element relative to the first element;
   c) adjusting the first element with respect to the second element in accordance with the parameter x;
   d) measuring the resultant tuning between said first element and second element, said tuning defined as "p(x)";
   e) repeating steps c) and d) until a predetermined change in quality of tuning is measured;
   f) determining if the adjustments in step c) are in a positive direction toward the local maximum;
   g) moving toward the local maximum using the directional information from step f), and measuring the quality of alignment p(x) until a decrease in the measured value of p(x) occurs;
   h) determining a quadratic fit q(x) using at least three measures of p(x) from steps g) and d);
   i) calculating $q_{max}$, then estimating $P_{max}$ and $x_{max}$ from q(x); and
   j) completing the alignment with respect to the x dimension by moving one of the first and second elements to $x_{max}$.

2. The method as defined in claim 1 wherein in performing step c), an initial step size is determined and used when each measurement is repeated according to step e).

3. The method as defined in claim 1 wherein in performing step c), an initial step size is determined and, when performing step e), the step size is changed between measurements.

4. The method as defined in claim 3 wherein the step size is increased between measurements.

5. The method as defined in claim 4 wherein the step size is increased until a maximum step size is obtained.

6. The method as defined in claim 4 wherein the predetermined step size is multiplied by a fixed factor between each measurement (e.g., x, 2x, 4x, 8x, . . . ).

7. The method as defined in claim 6 where the predetermined step size is doubled between each measurement.

8. The method as defined in claim 4 wherein the predetermined step size in linearly incremented between each measurement (x, 2x, 3x, 4x, 5x, . . . ).

9. The method as defined in claim 1 wherein in performing step e), the predetermined change in quality in tuning is a change greater than or equal to 10% of the originally measured value.

10. The method as defined in claim 1 wherein in performing step e), the predetermined change in quality in tuning is greater than $3\sigma_{noise}$.

11. The method as defined in claim 1 wherein in performing step b), transforming the approximation into a quadratic form with a negative coefficient, p=f(x) so as to exhibit a local maximum, the local maximum associated with proper tuning of said first element with respect to said second element.

12. The method as defined in claim 1 wherein in performing step j), the following steps are performed:
   1) measuring p(x) associated with $x_{max}$, defined as p'(x);
   2) comparing p'(x) to $p_{max}$ calculated in step i)
   3) if p'(x)≈$p_{max}$, stopping; otherwise, 4) calculating a new value of $x_{max}$ from p'(x) and q(x), denoted $x'_{max}$;

5) moving the first element to $x'_{max}$ and measuring p(x), denoted p"; and 6) repeating steps 3)–5) until $p(x) \approx p_{max}$ or p decreases.

13. The method as defined in claim 1 wherein the first element and the second element are tuned relative to one another along a second dimension y by repeating steps a)–j) and substituting "y" for each occurrence of "x".

14. The method as defined in claim 1 wherein three-dimensional tuning along x, y, and z is achieved using the following steps:

1) selecting a predetermined value for z;

2) performing steps a)–j) to approximately determine "$x_{max}$" and determine $p_{max}$, where $p_{max}=q_{max}$;

3) repeating steps a)"j), substituting "y" for "x" to determine "$y_{max}$";

4) decreasing z, holding $x_{max}, y_{max}$ fixed until a drop in coupling is noted;

5) re-calculating $x_{max}, y_{max}$ for the decreased z;

6) repeating steps 4) and 5) until $x_{max}, y_{max}, z_{max}$ are determined.

* * * * *